No. 650,001. Patented May 22, 1900.
J. P. BECKER & J. F. WENGER.
TREE SUPPORT.
(Application filed Dec. 7, 1899.)
(No Model.)
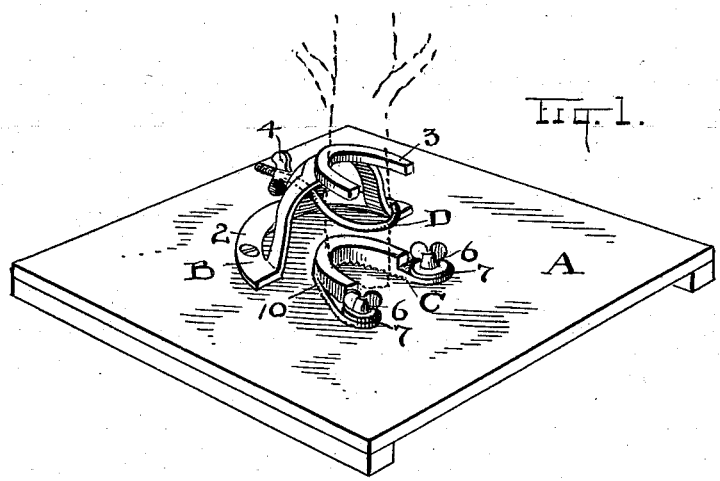
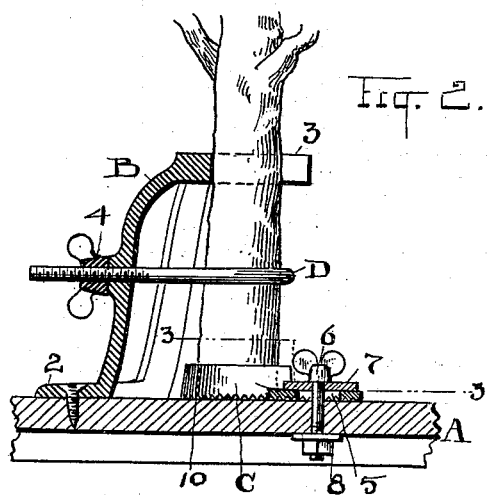
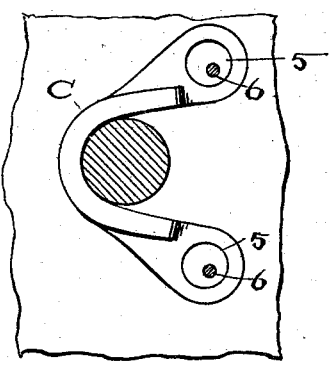
ATTEST
INVENTORS.
JOHN P. BECKER.
JOHN F. WENGER.
By H. V. Fisher ATT'Y

UNITED STATES PATENT OFFICE.

JOHN P. BECKER AND JOHN F. WENGER, OF CLEVELAND, OHIO.

TREE-SUPPORT.

SPECIFICATION forming part of Letters Patent No. 650,001, dated May 22, 1900.

Application filed December 7, 1899. Serial No. 739,513. (No model.)

*To all whom it may concern:*

Be it known that we, JOHN P. BECKER and JOHN F. WENGER, citizens of the United States, residing at Cleveland, in the county of Cuyahoga and State of Ohio, have invented certain new and useful Improvements in Tree-Supports; and we do declare that the following is a full, clear, and exact description of the invention, which will enable others skilled in the art to which it appertains to make and use the same.

Our invention relates to tree-supports; and the object of the invention is more especially to afford a support or stand for Christmas trees. Usually, and so far as we know universally, all supports or stands designed for this purpose hitherto have been of an improvised and temporary character, according as one thing or another offered to make up a sufficient stand; but we are not aware nor do we believe that any one before has devised a permanent stand intended to be used from season to season and having the special adaptations and advantages of construction which are embodied in the present invention and which comprise means which are calculated to accommodate themselves to crooked trees or trees which have a more or less bent stem or body, as well as those that are perfectly straight.

Our invention therefore consists in a tree support and stand comprised in several parts and all arranged and constructed substantially as shown and described, and particularly pointed out in the claims.

In the accompanying drawings, Figure 1 is a perspective view of a stand and the supporting member fixed thereon in a working relation. Fig. 2 is a vertical sectional elevation of a portion of the stand and of the supporting members and showing an elevation of the trunk or body of the tree engaged therein, as hereinafter more fully described. Fig. 3 is a plan view looking down on line 3 3, Fig. 2, and comprising one of the supporting members and a portion of a stand and showing a cross-section of a tree supported therein.

A represents what we denominate as our "stand" or "base," which is required to have such width as to prevent the tilting or falling over of the tree when it has been erected, and this stand or base may be of the identical construction here shown or of any equivalent construction and of any preferred material. Ordinarily a wooden base of boards or planks cut to length and brought together will serve the purpose. Upon this base or stand we employ two different and distinct members, the member or part B being referred to herein as the "standard" and the parts C as the "segment" or "yoke."

D is the hook by which the tree is firmly engaged against the other two members B and C and held in an upright position.

The standard B is provided with a flange 2 at its base, through which it is permanently secured to the stand A, and at its top it has an open loop 3 of horseshoe shape, which may also be referred to as the "yoke," within which the tree is supposed to be engaged, and midway of its elevation at its rear there is a hole for the passage of the shank or hook D. The said shank is threaded and is engaged on the outside by thumb-nut 4 for drawing the hook as tightly as may be required, and the said shank is of such length as to accommodate the device to trees of different sizes or thickness.

The bottom member or yoke C is provided at its extremities with enlarged holes 5 and which may be round or circular, as here shown, or oblong or of other shape and adapted to be engaged through by means of the short locking bolts or screws 6, one through each hole. A washer 7 of the requisite width overlaps the edges of the hole 5, and the bolt 6 passes through this washer and is engaged in or through the stand A—in this instance by a nut 8 on the under side of the stem.

By providing the yoke C with the enlarged openings 5 we are enabled to adapt our supporting mechanism to crooked trees and to take up any inclination that may be found in the tree when it has been first placed in position, the object, of course, being to have the tree stand perfectly erect. Assuming, therefore, that all the parts are in place, as shown in Fig. 1, and a tree is introduced and engaged by the hook D, and finding that the tree is not plumb or true vertically, screws 6 can be loosened sufficiently from the top by taking hold of the wings of the screw and adjusting the yoke C in the required direction until a perfectly-erect position of the tree is obtained, when the said screws or bolts are again fastened and the setting of the tree has been concluded.

The foregoing construction not only affords an easy and convenient mechanism for accomplishing the object set forth, but one which can be preserved and used again and again with each recurring season, as already indicated, and by reason of which the many serious accidents which occur with Christmas trees may be largely avoided. It is well known that frequently a Christmas tree, which is laden with gifts and with burning candles, is a source of not only serious accidents, but of disastrous fires, and all by reason of their temporary and make-shift supports, and which are insufficient to hold the tree, and not unusually children are burned to death by reason of such stands; but by the use of our invention no such accidents need occur, because there is in the structure a complete support for any and all trees of the usual sizes for family and kindred uses.

The bottom side of the yoke C has a sharp ribbed surface or locking spurs or projections 10 to more firmly fasten the yoke to the base when set by the screws 6. This prevents any possibility of the yoke from slipping.

What we claim is—

1. The support for a Christmas tree comprising the standard, the separate yoke for engaging the lower extremity of the tree and a hook in said standard, substantially as described.

2. The means herein described for supporting trees comprising a suitable base, a standard fixed thereto and constructed at its top for the tree to rest therein, a movable yoke on the base to engage the lower extremity of the tree and a hook through the standard to connect on the tree, substantially as described.

3. The base, in combination with the standard permanently fixed thereto and having a yoke-shaped top portion engaging the tree, a tree-engaging hook centrally in said standard and a separate member constructed to be adjusted on the said base to adapt the supports to the tree and constructed to have the lower extremity of the tree engaged therein, substantially as described.

4. A yoke to engage the extremity of a Christmas tree provided with enlarged openings at its bottom for the securing-bolts, whereby the yoke may be adjusted to the tree and having projections on its bottom to lock the same on the base, in combination with the base upon which said yoke is secured, substantially as described.

5. The support for a Christmas tree comprising the standard and base, an adjustable hook in said standard, and a separate adjustable yoke having locking projections on its bottom to engage said base, substantially as described.

Witness our hands to the foregoing specification this 29th day of November, 1899.

JOHN P. BECKER.
JOHN F. WENGER.

Witnesses:
H. E. MUDRA,
H. T. FISHER.